(12) United States Patent
Smith et al.

(10) Patent No.: US 7,124,851 B2
(45) Date of Patent: Oct. 24, 2006

(54) SEAT MOUNTING STRUCTURE FOR MITIGATING INJURY IN SIDE IMPACTS

(75) Inventors: Bradley W. Smith, Ogden, UT (US); Saeed D. Barbat, Farmington Hills, MI (US); Donald J. Paxton, Romeo, MI (US)

(73) Assignee: Autoliv ASP, Inc., Ogden, UT (US)

( * ) Notice: Subject to any disclaimer, the term of this patent is extended or adjusted under 35 U.S.C. 154(b) by 104 days.

(21) Appl. No.: 10/736,130

(22) Filed: Dec. 15, 2003

(65) Prior Publication Data

US 2005/0127645 A1 Jun. 16, 2005

(51) Int. Cl.
*B60N 2/427* (2006.01)

(52) U.S. Cl. ............... 180/274; 280/784; 280/748; 296/68.1; 296/65.12; 296/187.12; 297/344.14; 297/344.15; 297/344.16

(58) Field of Classification Search ......... 280/274, 280/282, 748, 784; 296/68.1, 65.05, 65.11, 296/65.12, 65.15, 187.12; 297/344.14, 344.15, 297/344.16; 180/274, 282

See application file for complete search history.

(56) References Cited

U.S. PATENT DOCUMENTS

| | | | | |
|---|---|---|---|---|
| 2,736,566 A | * | 2/1956 | Hartl | 280/29 |
| 2,970,862 A | * | 2/1961 | Racine | 296/68.1 |
| 4,396,220 A | | 8/1983 | Dieckmann et al. | |
| 5,123,673 A | * | 6/1992 | Tame | 280/801.1 |
| 5,149,165 A | * | 9/1992 | Woolley | 296/68.1 |
| 5,328,234 A | * | 7/1994 | Daniel et al. | 297/216.16 |
| 5,567,006 A | * | 10/1996 | McCarthy | 297/216.15 |
| 5,615,914 A | | 4/1997 | Galbraith et al. | |
| 5,727,815 A | | 3/1998 | Smith | |
| 5,845,937 A | * | 12/1998 | Smith | 280/784 |
| 5,908,204 A | | 6/1999 | Smith | |
| 5,967,603 A | * | 10/1999 | Genders et al. | 297/216.13 |
| 6,076,887 A | * | 6/2000 | Andersson | 297/216.1 |
| 6,120,082 A | * | 9/2000 | Vandermolen | 296/68.1 |
| 6,209,909 B1 | | 4/2001 | Breed | |
| 6,302,481 B1 | * | 10/2001 | Swann et al. | 297/216.18 |
| 6,364,399 B1 | * | 4/2002 | Gibby | 296/187.06 |
| 6,755,273 B1 | * | 6/2004 | Breed | 180/274 |
| 6,764,086 B1 | * | 7/2004 | Gnauert et al. | 280/124.137 |
| 6,869,132 B1 | * | 3/2005 | Wang et al. | 296/187.12 |
| 2002/0130528 A1 | * | 9/2002 | Mans | 296/68.1 |
| 2002/0147535 A1 | | 10/2002 | Nikolov | |

FOREIGN PATENT DOCUMENTS

FR 2786140 * 5/2000

* cited by examiner

*Primary Examiner*—Faye M. Fleming
*Assistant Examiner*—George D. Spisich
(74) *Attorney, Agent, or Firm*—Sally J Brown

(57) ABSTRACT

A seat mounting structure is disclosed for reducing injury to vehicle occupants in side impact collisions. The seat mounting structure may include an inflation module, a linkage system, a sensor system, and a side airbag. The inflation module may include an inflatable structure and inflator or a piston device. The linkage system attaches the seat mounting structure to a seat and may help guide the movement of the seat. The sensor system may include a radar sensor and an optical sensor to help the sensor system anticipate an impending side impact. The seat mounting structure mitigates injury to the occupant by moving the occupant vertically up and laterally toward a centerline of the vehicle, thus increasing the space between the sidewall of the vehicle and the occupant. Additionally, the inflation module may comprise an inflatable structure that stiffens a floor structure of the vehicle upon inflation.

25 Claims, 5 Drawing Sheets

SEAT MOUNTING STRUCTURE FOR MITIGATING INJURY IN SIDE IMPACTS

BACKGROUND OF THE INVENTION

1. Field of the Invention

The present invention relates to systems and methods for reducing injury to occupants during a side impact collision. More specifically, the present invention relates to displacing vehicle occupants away from and reinforcing the vehicle against intrusion in side impacts.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees from impact, or at other strategic locations.

Despite the development of side airbags, problems still remain in the area of side impact protection. For instance, insufficient space for side airbags to decelerate and cushion vehicle occupants is a continuing problem. Additional problems with side impact protection include the lack of strength in the vehicle sidewall, the close proximity of an occupant to the impact zone, and the higher likelihood of intrusion by the impacting vehicle into the occupant compartment of the vehicle.

These problems are compounded by differences in vehicle characteristics between the impacting vehicle and the target vehicle. Some of these characteristics include weight differences, geometry differences, differences in stiffness, and particularly differences in height off the ground. Vehicle compatibility becomes a concern when the impacting vehicle and the target vehicle are mismatched, for instance, when a larger SUV (sport utility vehicle, light truck, or van) impacts a smaller compact car.

In a mismatched collision, the smaller target vehicle undergoes a higher velocity change, and has less structure to absorb the impact energy. In a mismatched side impact, the larger striking vehicle is elevated with respect to the smaller target vehicle causing the brunt of the impact to be absorbed by the passenger compartment of the target vehicle, rather than striking the target vehicle's horizontal base member, or sill.

Since the side of the passenger compartment is often less stiff than the striking car's front, the side of the target vehicle is deformed into the passenger compartment. The smaller target vehicle potentially has less interior space to mitigate this effect of intrusion into the passenger compartment and the impact of the striking vehicle can hit the occupant of the target vehicle at speeds approximating the initial speed of the striking vehicle. The occupants of the target vehicle are severely endangered thereby.

A recent analysis of crash data reveals that larger SUV-to-car collisions produce a significantly higher rate of fatalities than car-to-car collisions. For example, when SUVs strike passenger cars on the left side, the risk of death to the car driver is five times higher than the risk associated with a car-to-car left side impact collision. The recent increase in the percentage and number of larger vehicles, such as SUVs, currently operating has exacerbated this problem.

To counteract these problems, some vehicle protection systems have been developed to move the occupant and increase the distance between the occupant and the vehicle sidewall. These systems include moving the occupant laterally or tilting the seat away from the impact area.

However, these methods have not fully solved the problems described above. For instance, many vehicles have a hump in the middle of the vehicle that prohibits lateral motion. Tilting the seat accelerates the occupant's head toward the middle of the vehicle, which acceleration may injure the occupant. In addition, neither method protects the occupant against intrusion into the occupant compartment of the vehicle. Neither method provides an answer to the increased risks associated with a high profile vehicle impacting a low profile vehicle.

SUMMARY OF THE INVENTION

The apparatus and method of the present invention have been developed in response to the present state of the art, and in particular, in response to the problems and needs in the art that have not yet been fully solved by currently available occupant protection devices. In accordance with the invention as embodied and broadly described herein in the preferred embodiment, a novel side impact protection system is provided. The side impact protection system is a seat mounting system that comprises an anticipatory sensor system, an inflation module, and a linkage system.

The inflation module may comprise an inflator and one or more inflatable structures. The inflation module may perform two tasks: displacing the seat and stiffening a floor structure of the vehicle. The first task is performed by mounting the seat on top of an inflatable structure, which displaces the seat vertically and/or laterally when the inflatable structure inflates. Moving the occupant vertically upward is important because this allows the seat to move laterally toward the center of the vehicle without obstruction by the middle hump. This movement also lessens the likelihood of direct contact by the intruding sidewall into the occupant's vital areas. The second task is performed when the inflatable structure is inflated and stiffens the floor structure. A stiffened floor structure inhibits intrusion into the occupant compartment of the vehicle.

The linkage system operates in combination with the inflation module. As the inflatable structure is inflated, the linkage system harnesses the vertically upward motion of the inflating inflatable structure to guide the seat vertically up and laterally toward a centerline of the vehicle. Alternatively, if the inflatable structure moves the seat laterally, then the linkage system may harness the lateral motion and guide the seat vertically upward.

The sensor system may be an anticipatory sensor system such as those known in the art. The sensor system may comprise at least one sensor, an electronic control unit, and electrical connectors that connect components of the sensor system. The sensor system may detect a side impact and/or an impending side impact. When an impending side impact is detected, the sensor system initiates the inflation module. A sensing system may be included to detect an impending collision. Such sensing systems may include optical sensors utilizing lasers, microwaves or infrared sensors. Radar sensors or ultrasonic sound wave sensors may be employed. An accelerometer for measuring heavy deceleration may also be used. When a radar sensor is used, a radar antenna sends out a short, tightly focused, high-power pulse of radio waves at a known frequency. When the waves hit an object, they echo off of it and the speed of the object Doppler shifts the echo. The antenna receives the returning signals and the signals are analyzed by an electronic control unit to determine if there is an impending side impact. If the electronic control unit determines that a side impact is impending, the electronic control unit will actuate the inflation module and possibly a side airbag system.

In one exemplary embodiment, the linkage system comprises two bars, each with one end pivotally fixed in relation to the floor structure. The other end is pivotally attached to a seat mount. The seat mount is also attached to a seat adjustment structure and slidably attached to a track mounted on top of the inflatable structure. The seat adjustment structure may be a standard structure that allows an occupant to adjust their seat for comfortable positioning within the vehicle. The track allows the seat mount to slide laterally on the inflatable structure.

The linkage system maintains the seat mount, and therefore the seat, in place until the inflatable structures are inflated. Once inflation begins, the bars pivot to guide the seat about a circular path, which guides the seat laterally toward the centerline of the vehicle and vertically up. The seat mount, and therefore the seat, has the added advantage of being uniformly displaced in curvilinear translation such that little or no tilting of the seat takes place. In other words, the front, back, and each side is displaced and guided substantially at the same rate by the inflation module and the linkage system so that the seat remains at the same general orientation as before inflation.

Alternative embodiments may be used that vary the linkage system and/or the inflation module. For instance, the linkage system may comprise one bar instead of two, or a plurality of bars. The inflation module may comprise a piston device actuated by a gas generant having a piston that displaces a seat vertically up and laterally toward the centerline of the vehicle. The linkage system may comprise a seat mount slidably attached to a rail that supports the movement of the seat vertically up and laterally toward the centerline of the vehicle.

Some advantages of the invention include moving a vehicle occupant up over obstacles that impede lateral movement and stiffening the floor structure to reduce intrusion in the occupant compartment of the vehicle. Obstacles may include vehicle structures, such as the ridge that extends down the middle of the vehicle. Therefore, the occupant is able to move further away from the impact side of the vehicle. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited features and advantages of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention as claimed, but is merely representative of presently preferred embodiments of the invention.

The present invention utilizes a number of physical principles to enhance the protection of vehicle occupants in a side impact collision. For example, a linkage system converts a portion of vertical motion into lateral motion or a portion of lateral motion into vertical motion. An elongated metal inflatable structure, upon inflation, increases the mass moment of inertia of the inflatable structure, making the inflatable structure stiffer and less likely to fail in buckling or bending. Furthermore, the orientation of an inflatable structure to a side impact affects how the impact energy is applied to the inflatable structure. How the impact energy is applied dictates how much impact energy may be resisted and absorbed by the inflatable structure.

Such principles may be applied to many types of inflatable structures and linkage systems, including airbags, metal inflatable structures, four bar mechanisms, tracks, and rails. An illustrative manner in which the present invention utilizes these principles to provide side impact protection will be shown and described in greater detail with reference to FIGS. 1 through 5.

For this application, the phrases "connected to" and "coupled to" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion. The phrase "attached directly to" refers to a form of attachment by which the attached items are either in direct contact, or are only separated by a single fastener, adhesive, or other attachment mechanism.

Figure 1:
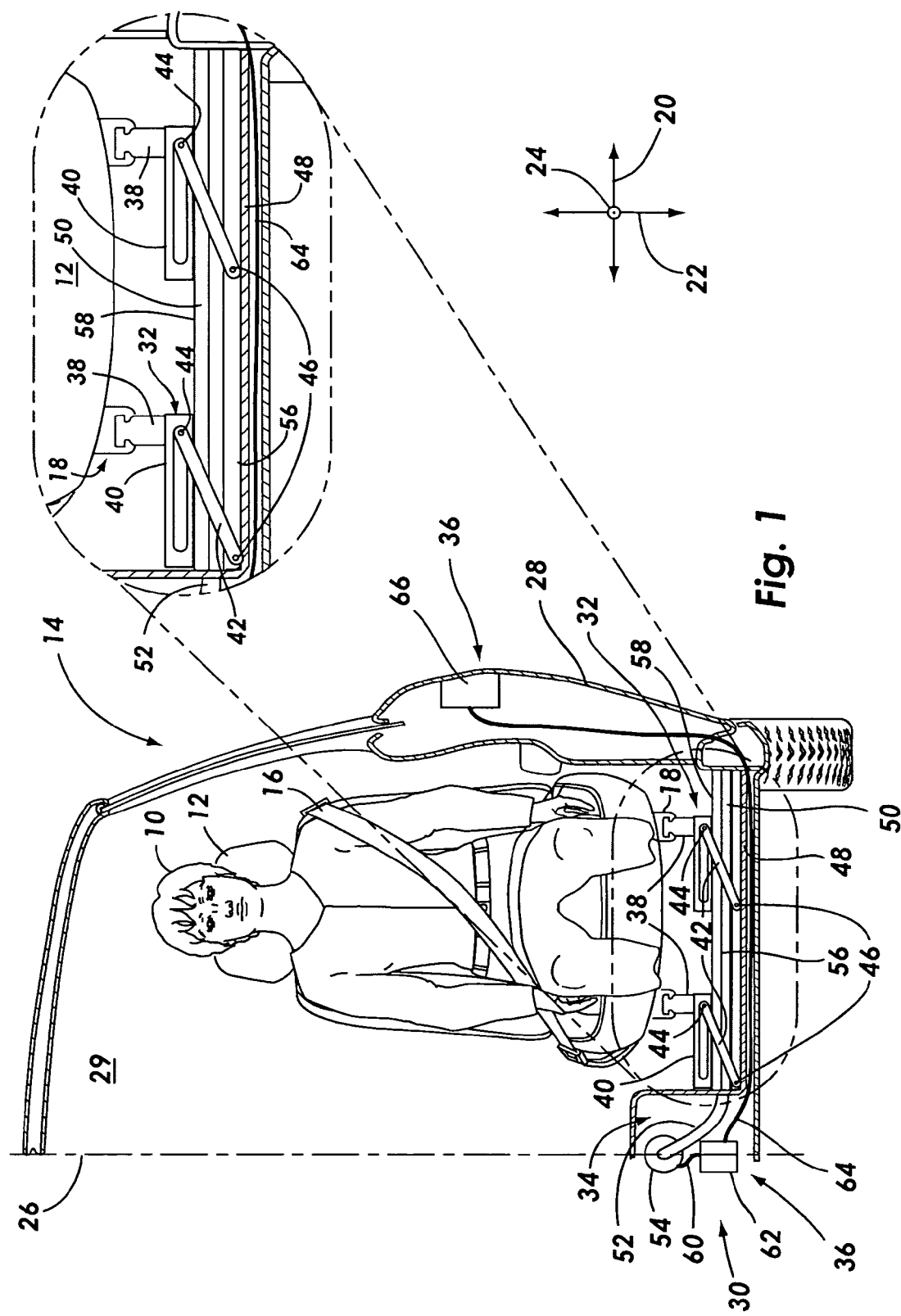
FIG. 1 is a cutaway, front elevation view of one embodiment of a seat mounting structure within the scope of the invention.

FIG. 1 illustrates a cutaway, front elevation view of a seat mounting structure for mitigating injury in side impacts within the scope of the invention. As shown, an occupant 10 is seated in a seat 12 of the vehicle 14 and restrained by seat belt 16. The seat belt 16 may be integral with the seat 12 and is designed to restrain the occupant 10 on the seat 12 when the seat 12 is displaced in accordance with the invention. The seat 12 also comprises a seat adjustment structure 18 that allows the seat to be adjusted forward and backward for the comfort of the occupant.

Figure 2:
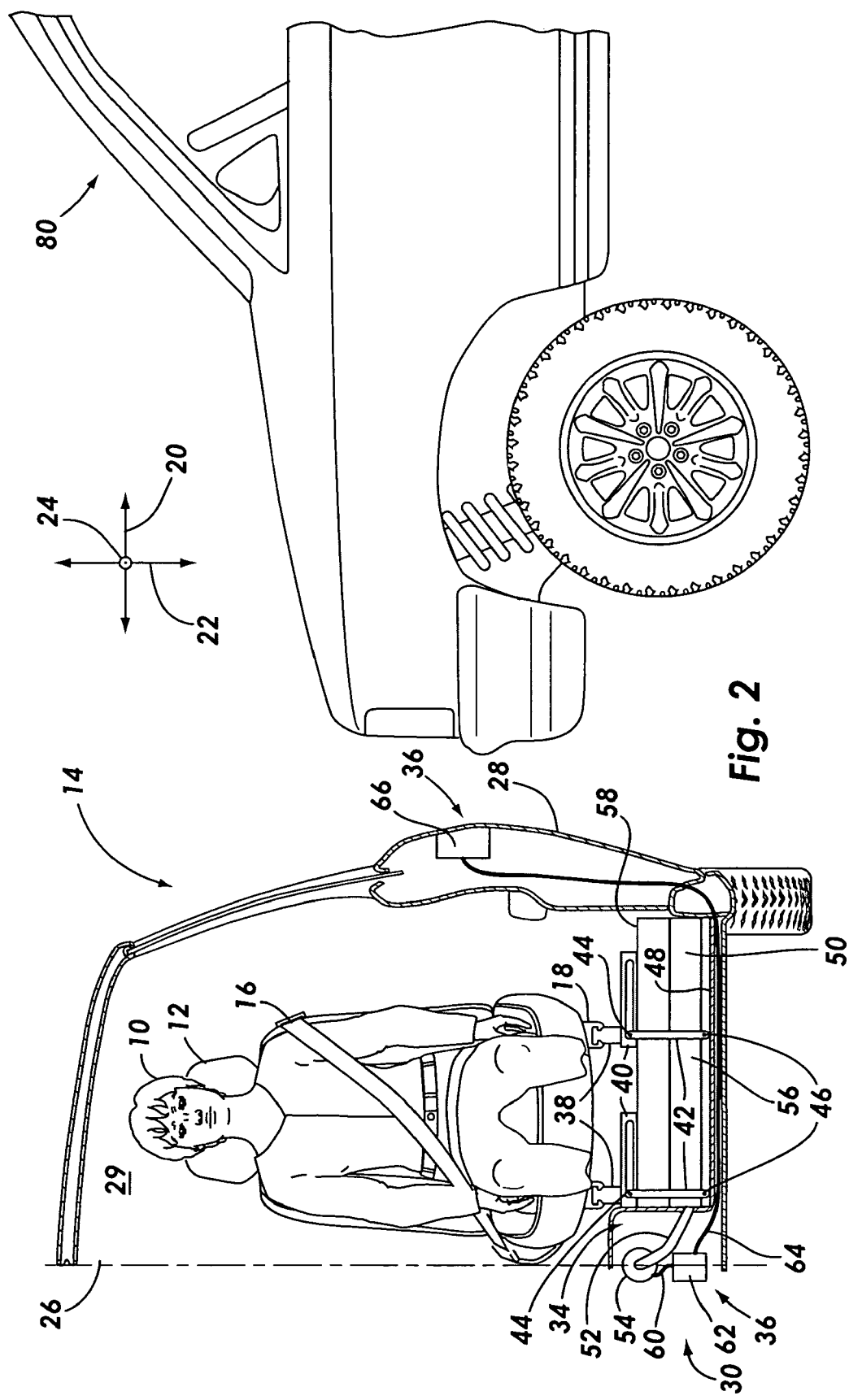
FIG. 2 is a cutaway, front elevation view of the seat mounting structure of FIG. 1 with the inflatable structures fully inflated.
Figure 3:
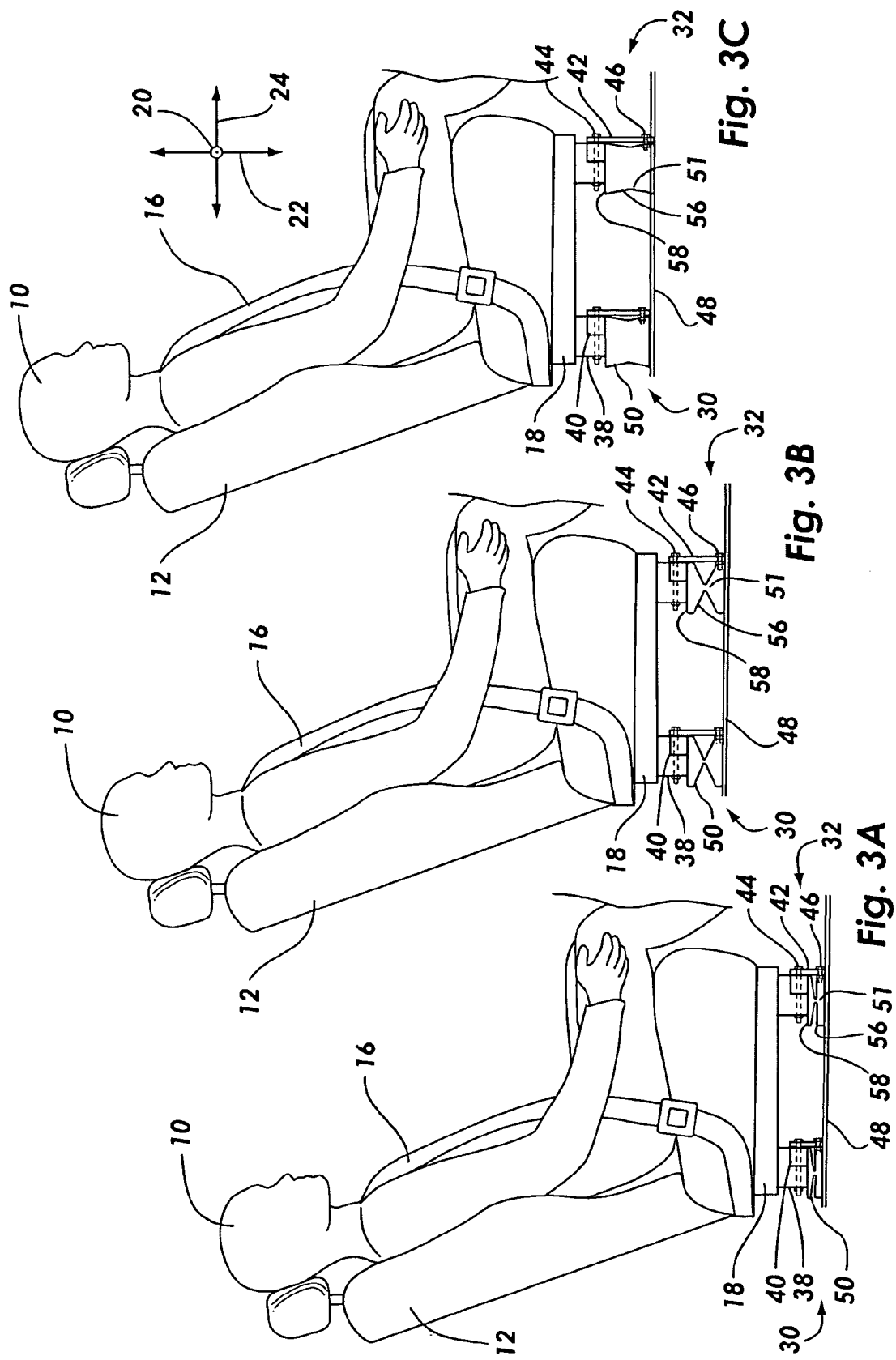
FIGS. 3A, 3B, and 3C are side elevation views of the seat mounting structure of FIG. 1 showing the inflation of the inflatable structures ranging from an uninflated folded state, a half inflated state, and a fully inflated state, respectively.

FIG. 1 has three directions depicted for clarification of movement related to FIGS. 1, 2, and 3. The directions depicted are lateral 20, vertical 22, and transverse 24. Additionally, a centerline 26 is depicted as a line disposed midway between two vehicle sidewalls 28. The vehicle sidewalls 28 also help define an occupant compartment 29 within the vehicle 14.

Also shown in FIG. 1, the seat 12 is attached to a seat mounting structure 30, which is attached to the vehicle 14. The seat mounting structure 30 connects the seat 12 to a floor structure 48. The seat mounting structure 30 comprises a linkage system 32, an inflation module 34, and sensor system 36. The linkage system 32 guides the motion of the seat 12 vertically 22 up and laterally 20 toward the centerline 26 of the vehicle 14. The sensor system 36 detects an impending side impact and initiates the inflation module 34. Once initiated, the inflation module 34 proceeds to displace the seat 12 vertically 22 upward.

The linkage system 32 shown in FIGS. 1 and 2 comprises a seat mount 38, two tracks 40, and two bars 42 each having a first pivot 44 on one end and a second pivot 46 on the other end. The seat mount 38 is the structure upon which the seat is mounted. The structure of the seat mount 38 can vary depending on the make and model of the vehicle and the characteristics of a seat. The seat mount may comprise holes in different parts of the seat mounting structure 30, parts that are connected to the seat adjustment structure 18, or a bracket for attaching the seat adjustment structure 18 or seat 12 to the seat mounting structure 30.

The seat mount 38 is attached to the seat adjustment structure 18 and is slidably attached to the tracks 40. Each track 40 is attached to a top of inflatable structures 50 and 51 of the inflation module 34. Each track 40 allows the seat mount 38 to be slidably attached to seat mounting structure 30, thereby allowing lateral 20 movement of the seat 12. Lateral 20 movement of the seat 12 is controlled by the bars 42. The first pivots 44 of the bars 42 are pivotally attached to the seat mount 38. The second pivots 46 of the bars 42 may be pivotally attached to bottom portion of the inflation module 34. The second pivots 46 may instead be pivotally attached to a floor structure 48 of the vehicle 14. Generally, the second pivots 46 are disposed in a fixed location with respect to the vehicle 14.

The inflation module 34 comprises a first inflatable structure 50, a second inflatable structure 51 (shown in FIG. 3), connecting tubes 52, and an inflator 54. The second inflatable structure 50s in this embodiment is an elongated metal structure, each having two folded sidewalls 56. The top wall 58 of the inflatable structure 50 may have a wall thickness of about 0.06 inches. The wall thickness of the inflatable structure 50 preferably ranges from 0.04 to 0.06 inches, though the wall thickness may be thicker or thinner.

The inflatable structures 50 and 51 are oriented laterally 20 with the first inflatable structure 50 positioned under a front portion of the seat 12. A second inflatable structure 51 (shown in FIG. 3) is positioned under a rear portion of the seat 12. The inflatable structures 50 and 51 are directly attached to the floor structure 48 of the vehicle 14. The connecting tubes 52 connect the inflatable structures 50 and 51 to the inflator 54. The inflator 54 may be attached to the floor structure 48 of the vehicle 14. The inflator 54 may be positioned anywhere in the vehicle 14 and may actually be positioned to directly inflate the inflatable structures 50 and 51 without the need of connecting tubes 52.

In addition to the elongated metal inflatable structures 50 and 51, several other types of inflatable structures may also be used. For instance, a single airbag or metal structure may be used in place of both inflatable structures 50 and 51. Additional elongated metal structures may also be used.

The sensor system 36 may be attached to the inflator 54 via a first set of wires 60. The first set of wires 60 comprise a first end connected to the inflator 54 and a second end connected to an electronic control unit 62. A second set of wires 64 comprises a first end connected to the electronic control unit 62 and a second end connected to the sensors 66. It will be appreciated that the inflator 54, electronic control unit 62, and sensors 66 may be connected using wireless electronic connectors known in the art.

The sensors 66 may comprise a radar sensor, an optical sensor, or other sensors capable of detecting an impending side impact or an actual side impact. A radar sensor sends out a short, tightly focused, high-power pulse of radio waves at a known frequency. When the waves hit an object, such as another vehicle, they echo off of it and the speed of the object Doppler shifts the echo. The radar sensor receives the returning signals and determines whether a collision is imminent.

Optical sensing systems may be employed for detecting an impending side impact. A specific example of an optical sensor is lidar (light detection and ranging). With lidar, a very short burst of infrared laser light is emitted and its reflection is detected, thus determining the distance from the approaching vehicle. By taking thousands of samples per second, the change in distance indicates the location and speed of the oncoming vehicle. Other sensing systems such as ultrasonic sound wave sensors, optical microwave sensors, or an accelerometer for measuring heavy deceleration could also be employed.

The electronic control unit 62 analyzes the signals sent by the sensors 66 to determine if a side impact has occurred or is likely to occur. Preferably, an anticipatory sensor system is used, wherein the sensors 66 are able to sense the surrounding environment of the vehicle 14 and the electronic control unit 62 is able to determine if a side impact is likely to occur. Once the electronic control unit 62 determines that a side impact is occurring or is likely to occur, the electronic control unit 62 actuates the inflator 54 to inflate the inflatable structure. Being able to anticipate a side impact prior to the actual impact has the benefit of giving the vehicle safety systems more time to prepare the safety measures to better protect the vehicle occupant 10.

In addition to the sensor system described above, seat mounting structure 30 may also be used with in-seat weight sensors and occupant position sensors. These additional sensors can be used to better deploy the safety systems by detecting the size and location of the occupant 10 in relation to the seat.

The seat mounting structure 30 described above mitigates injury from side impacts in the following manner. First, the sensors 66 detect a side impact or an impending side impact, if anticipatory sensors are used. Second, the signal from the sensors 66 is sent to the electronic control unit 62 via the second set of wires 64. Third, the electronic control unit 64 determines that an impact has occurred or is likely to occur and sends an initiation signal to the inflator 54 via the first set of wires 60.

Fourth, the inflator 54 is actuated to inflate the inflatable structures 50 and 51 via the connecting tubes 52. Fifth, the inflatable structures 50 and 51 inflate and raise the seat vertically 22 upward. Sixth, as the seat mount 38 is displaced vertically 22 upward, and the linkage system 32 moves the seat laterally 20 toward the centerline 26. According to the linkage system 32 illustrated in FIGS. 1–3, the bars 42 pivot and pull the seat mount 38 on the track 40 laterally 20 toward a centerline 26 of the vehicle 14. Therefore, the seat 12 connected to the seat mount 38 moves both vertically 22 upward and laterally 20 toward the centerline 26 of the vehicle 14. This method effectively moves the occupant 10 away from the side impact and up so that the occupant's 10 vital organs are less exposed to the force of the impact.

The inflatable structures 50 and 51 may also be configured to provide additional protection to the occupant 10. This may be accomplished by designing the inflatable structures in a manner such that they stiffen and strengthen the floor structure 48. For example, the inflatable structures may comprise an elongated metal structure with folded sidewalls. These inflatable structures 50 and 51 may be used alone or in conjunction with other configurations of this invention. When inflated, the inflatable structures 50 and 51 stiffen the floor structure 48 around the seat 12 of the occupant 10 and a lower portion of a side of the vehicle 14. These inflatable structures 50 and 51 may reduce intrusion of an impacting vehicle 80 into the occupant compartment 29 of the vehicle 14, especially around the seat of the occupant.

The inflatable structures 50 and 51 are preferably laterally 20 oriented and attached to the floor structure 48 of the vehicle 14. Inflation of the inflatable structures 50 and 51 increases the mass moment of inertia of the inflatable structures, thus increasing the stiffness of the inflatable structures 50 and 51 and the floor structure 48. Furthermore, the internal pressure of the inflated structure additionally helps prevent deformation of the inflatable structures 50 and 51. This enhances their ability to reinforce the floor structure 48. As explained above, the placement of the inflatable structures 50 and 51 under the seat 12 of the occupant 10 also provides a means for displacing the seat 12. Though the stiffening protection detailed above would not be available with other inflatable structures, such as ordinary airbags, other inflatable structures may be used to displace of the seat 12 vertically 22 upward and laterally 20 toward the centerline 26.

Finally, the lateral 20 positioning of the inflated structures 50 and 51 is an improvement over transverse 24 positioning because lateral 20 positioning of the inflatable structures allows an area around the occupant 10 to be better protected against intrusion than just reinforcing a vehicle side wall 28 transversely 24. Additional laterally 20 oriented inflatable structures designed to stiffen a floor structure of the vehicle 14 may be positioned in front of or behind the seat 12 for added protection.

FIG. 2 shows a cutaway, front elevation view of the seat mounting structure of FIG. 1, wherein the inflatable structures 50 and 51 are fully inflated. As shown, the bars 42 of the linkage system 32 have pivoted such that the seat 12 has been guided laterally 20 on the track 40 as a result of the vertically 22 upward displacement of the seat 12 by the inflatable structures 50 and 51. Also, the movement of the seat 12 approximates curvilinear translation, wherein each corner of the seat 12 is moving on parallel paths at approximately the same rate such that the orientation of the seat 12 and occupant 10 remains substantially unchanged throughout the translation of the seat 12. FIG. 2 shows a side impact is about to occur, with the impacting vehicle 80 close to the vehicle 14.

Referring to FIGS. 3A, 3B, and 3C, a side elevation cutaway view of the seat mounting structure of FIG. 1 illustrates inflation of the inflatable structures 50 and 51 in an original folded state, a half inflated state, and fully inflated state, respectively. As shown in FIG. 3A, the inflatable structures 50 and 51 are substantially flat in their folded state. FIG. 3B shows the inflatable structures 50 and 51 half inflated, and FIG. 3C shows the inflatable structures 50 and 51 fully inflated. The folded sidewalls 56 allow the top wall 58 of the inflatable structures 50 and 51 to support the track 40 of the linkage system 32 by providing an area of the inflatable structures 50 and 51 that does not deform when the inflatable structures 50 and 51 are inflated.

Figure 4:
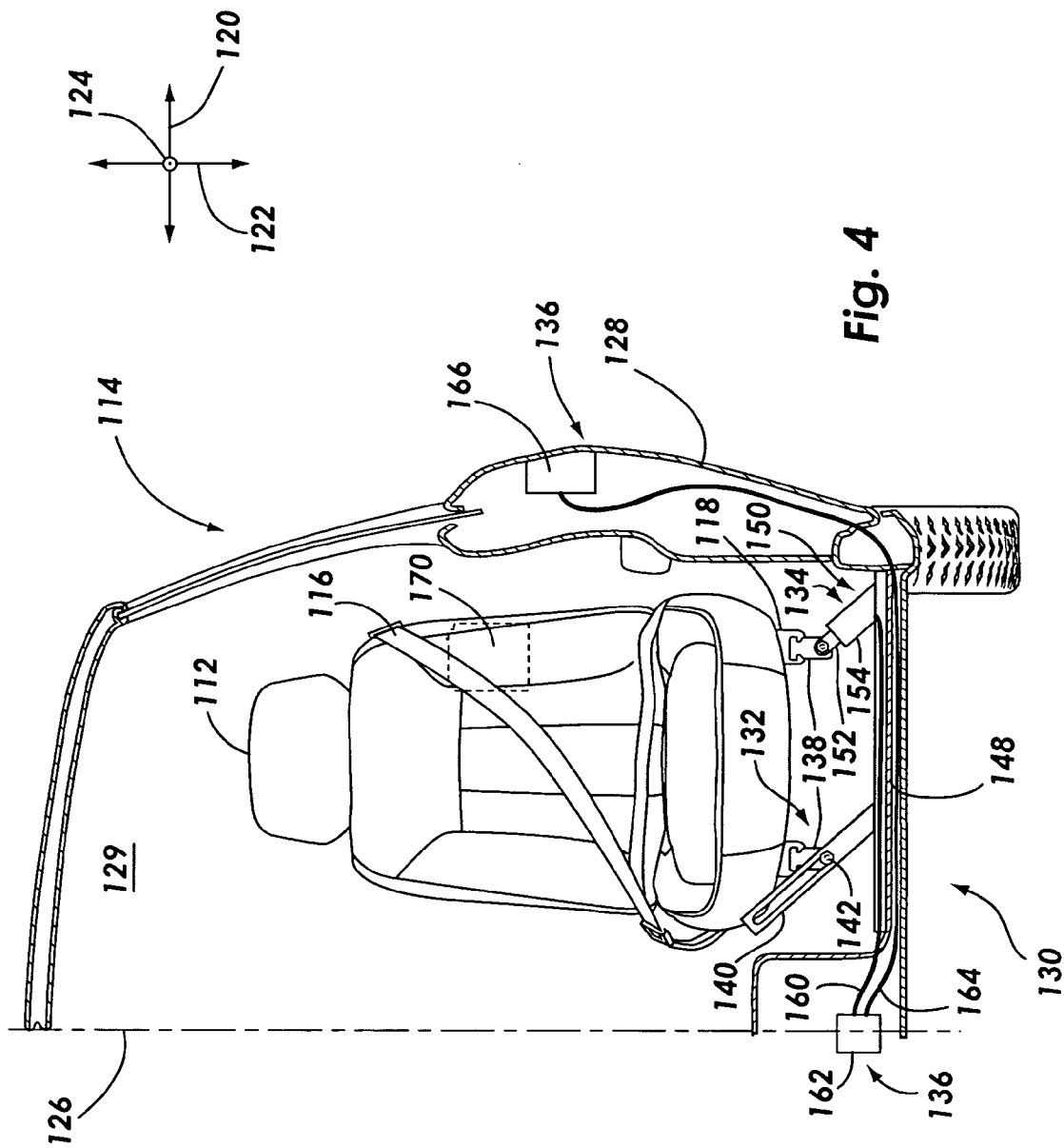
FIG. 4 is a cutaway, front elevation view of an alternative embodiment of a seat mounting structure within the scope of the invention.

Referring to FIG. 4, an alternative embodiment of the invention is shown in a cutaway, front elevation view. Like FIGS. 1 through 3, a seat 112 is shown in a vehicle 114. The seat 112 comprises an integrally formed seat belt 116 and a seat adjustment structure 118 that allows an occupant to adjust the seat 112 for their comfort within the vehicle 114.

The directions within the vehicle are laterally 120, vertically 122, and transverse 124 and are shown in the Figure. A centerline 126 of the vehicle 114 is shown as an imaginary line drawn midway between the vehicle sidewalls 128. The vehicle 114 also comprises a occupant compartment 129 disposed between the vehicle sidewalls 128.

The seat mounting structure 130 comprises a linkage system 132, an inflation module 134, and sensor system 136. The linkage system 132 in this embodiment comprises a seat mount 138, a rail 140, and a slider 142. The seat mount 138 is attached to the seat adjustment structure 118. A rail 142 is attached to a floor structure 148 of the vehicle 114. A slider 142 is connected to the seat mount 138 and is slidably attached to the rail 140.

The inflation module 134 comprises a piston device 150. The piston device 150 is preferably a gas generant actuated device, wherein a gas generant is stored within the piston device 150. When the piston device is initiated by the sensor system, the gas generant reacts to form a gas that expands and pushes the piston head 152 out of the piston housing 154. The piston head 152 is connected to the seat mount 138 so that movement of the piston head 152 results in displacement of the seat. In this embodiment, the piston device 150 is mounted on an angle that is substantially identical the angle the rail 140 is mounted. Therefore, the displacement of the seat 112 by the piston device 150 is supported by the rail 140.

The piston device 150 may also take many forms and configurations. For instance, the piston device may have a piston head that moves on the outside of the piston housing. Also, the piston device may alternatively be actuated by an internally stored pressurized liquid or an external inflator. The inflator may contain a pressurized liquid, a gas generant, or a combination of both. It should also be apparent from this disclosure that any number of the inflatable structures may be used to displace the seat, including a single inflatable structure.

The piston device 150 is initiated through a first set of wires 160 by an electronic control unit 162 of the sensor system 136. The electronic control unit 162 interprets signals provided through a second set of wires 164 from the sensors 166 to determine if there has been a side impact or if there is an impending side impact.

The sensor system 136 may also be electronically connected to a side airbag system 170 to enhance the protection of an occupant in side impacts. Combining a conventional side airbag system 170 with the seat mounting structures 30 and 130 detailed above provides more occupant protection by moving the seat 112 away from the impact and provide added padding that results from use of the side airbag system 170.

A side airbag within the meaning of this disclosure includes any inflatable structure that is inflated between a seat and a vehicle sidewall. The term side airbag may include both a side airbag and inflatable curtains. Additionally, a side airbag may be mounted in a variety of locations known in the art. A side airbag may be mounted in the seat or in the roof rail of a vehicle. An advantage provided by this invention is that a side airbag may be bigger to take advantage of the extra available space, after movement of the seat to provide more protection to a vehicle occupant.

Figure 5:
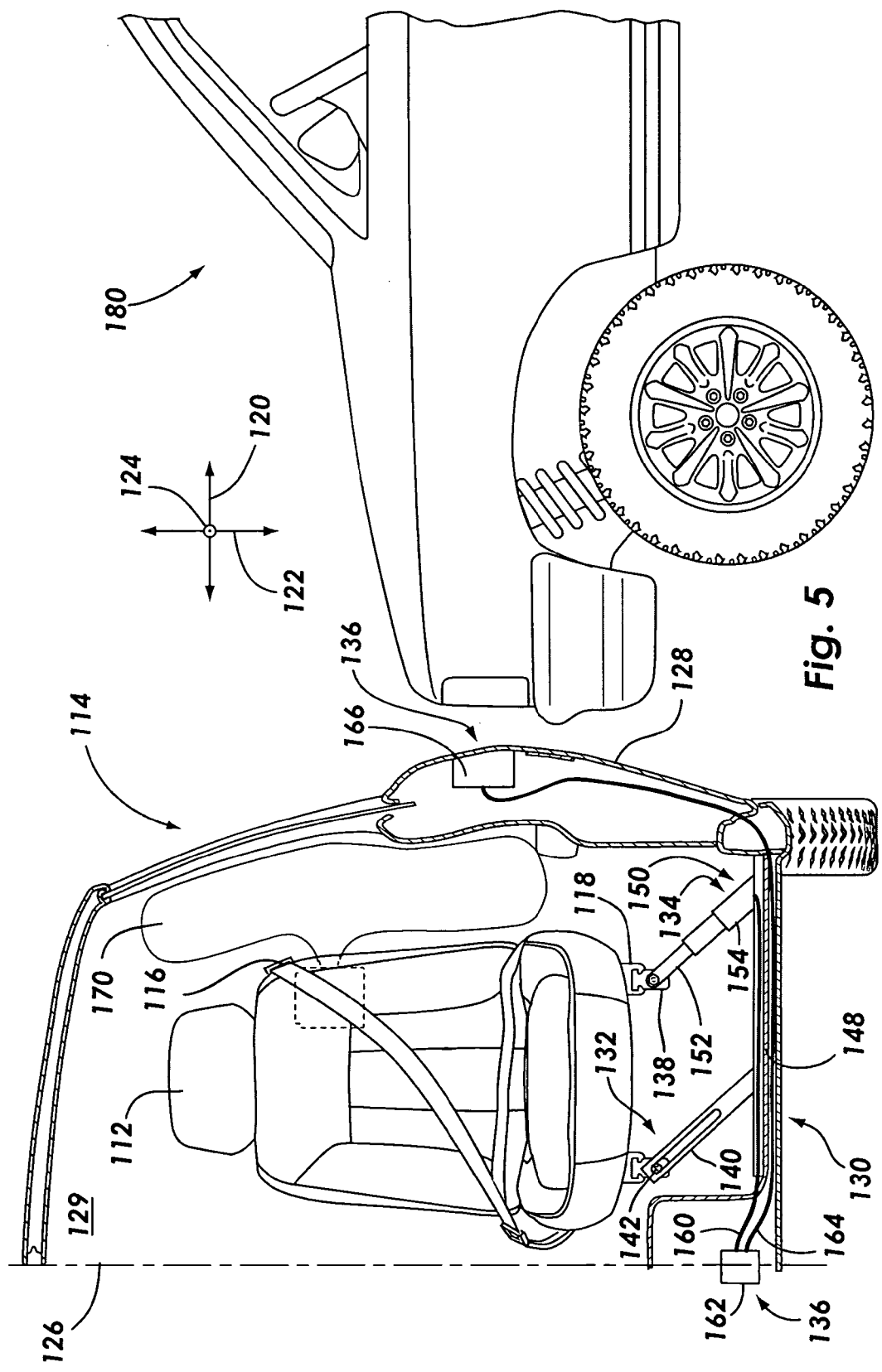
FIG. 5 is cutaway, front elevation view of the alternative embodiment of a seat mounting structure of FIG. 4 in a fully activated state.

FIG. 5 shows the seat mounting structure 130 of FIG. 4 with the piston head 152 fully extended from the piston housing 154. As shown, the seat 112 has been moved vertically 122 up and laterally 120 toward the centerline 126 of the vehicle 114. In addition, the side airbag 172 has been deployed between the vehicle sidewall 128 and the seat 112.

From this disclosure, it would also be apparent to one skilled in the art that piston devices could be used alone to displace the seat 112 vertically 122 up and laterally 120 toward the centerline 126 of the vehicle 114. In that configuration, the linkage system would only be a seat mount as described above. In addition, inflatable structures that stiffen the floor structure 148 of the vehicle 114 may also be used in combination with piston devices to further protect the occupant from injury.

Those skilled in the art will appreciate that other configurations may be used to displace the seat vertically up and laterally toward the centerline. For example, one alternative configuration (not shown) of the invention uses a piston device that is vertically oriented. As the seat is displaced vertically up, a linkage system guides the seat laterally toward the centerline of the vehicle. The linkage system comprises a seat mount, a curved rail, and a track. The curved rail is slidably attached to the seat mount, and connected to a floor structure of the vehicle. The piston head is connected to the track and the track is slidably attached to the seat mount.

Of course, an alternative linkage system comprising a seat mount, bars, and a track may also be used with this configuration to guide the seat laterally toward the centerline of the vehicle. The bars may have one end pivotally connected to the floor structure of the vehicle and the other end connected to the seat mount.

Another alternative configuration orients the piston device laterally. As the piston head moves laterally toward the centerline of the vehicle, the seat mount is forced to slide on a rail vertically up and laterally toward the centerline of the vehicle. The piston head may be connected to a vertically oriented track with the track slidably attached to the seat mount. The track allows the seat to move in curvilinear translation.

The seat mounting structures described above are simply examples. The inflator design, linkage system, and inflation module requirements may be modified as needed to perform the functions described herein. Many other inflator designs, linkage systems, and inflation modules may be created within the scope of the present invention by combining, isolating, or otherwise modifying the features depicted in the figures.

The airbag modules and associated methods of the present invention improve vehicle safety systems related to side impacts. Through the use of inflatable structures, a seat may be displaced up and away from a side impact and a floor structure of a vehicle may be stiffened to help reduce intrusion in the occupant compartment of the vehicle. In addition, the seat may move over obstacles such that the seat may move farther laterally than otherwise possible. Anticipatory sensors allow the occupant to be moved before an impact takes place. The extra time and space allows a side airbag to be deployed that is able to more effectively decelerate and cushion the occupant.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A seat mounting structure for use in a vehicle, that lessens the risk of injury to an occupant in side-impact collisions, the seat mounting structure comprising:
   a sensor system;
   a linkage system that guides a seat vertically up and laterally toward a centerline of the vehicle in such a manner that the seat is uniformly displaced in a substantially curvilinear translation such that little or no tilting of the seat takes place; and
   an inflation module comprising an inflator and an inflatable structure, wherein the inflatable structure inflates in response to the sensor system, wherein the inflation of the inflatable structure displaces the seat in accordance with the linkage system.

2. The seat mounting structure of claim 1, wherein the inflation of the inflatable structure stiffens a floor structure of the vehicle to resist intrusion in a side-impact.

3. The seat mounting structure of claim 2, wherein the inflatable structure comprises metal.

4. The seat mounting structure of claim 3, wherein the thickness of the metal of the inflatable structure is in the range of about 0.04 inches to about 0.06 inches.

5. The seat mounting structure of claim 2, wherein the inflatable structure comprises an elongated structure having two folded sidewalls.

6. The seat mounting structure of claim 1, wherein the linkage system comprises a bar, wherein the bar comprises a first end pivotally fixed in position with respect to the vehicle and a second end pivotally fixed in position with respect to the seat, wherein the bar pivots about the first end and the second end in response to inflation of the inflatable structure in order to guide the seat vertically up and laterally toward the centerline of the vehicle.

7. The seat mounting structure of claim 1, wherein the linkage system comprises a track attached to a top portion of the inflation module, wherein the seat slides laterally toward the centerline of the vehicle while the inflatable structure displaces the seat vertically up.

8. The seat mounting structure of claim 1, wherein the sensor system comprises an anticipatory sensor system that initiates the inflation of the inflatable structure in anticipation of an impending side impact.

9. The seat mounting structure of claim 8, wherein the anticipatory sensor system comprises an optical sensor.

10. The seat mounting structure of claim 8, wherein the anticipatory sensor system comprises a radar sensor.

11. A seat mounting structure for use in a vehicle, that lessens the risk of injury to an occupant in side impact collisions, the seat mounting structure comprising:

a sensor system;

a linkage system comprising a seat mount; and an inflation module comprising a piston device, wherein the piston device actuates in response to the sensor system, wherein the seat mount is structured such that upon actuation of the piston device the seat is moved in such a manner that little or no tilting of the seat takes place, and wherein the seat is displaced vertically up and laterally toward a centerline of the vehicle.

12. The seat mounting structure of claim 11, wherein the linkage system comprises a track attached to a top portion of the piston device, wherein the seat slides laterally toward the centerline of the vehicle while piston device actuates the seat vertically up.

13. The seat mounting structure of claim 11, wherein the linkage system comprises a rail, wherein the rail guides the seat vertically up and laterally toward a centerline of the vehicle in response to a sensor system.

14. The seat mounting structure of claim 11, wherein the displacement of the seat approximates curvilinear translation of the seat.

15. The seat mounting structure of claim 11, wherein the seat mounting structure further comprises an anticipatory sensor system that actuates the piston device in anticipation of an impending side impact.

16. The seat mounting structure of claim 15, wherein the anticipatory sensor system comprises an optical sensor.

17. The seat mounting structure of claim 15, wherein the anticipatory sensor system comprises a radar system.

18. The seat mounting structure of claim 11, wherein the floor is stiffened to further protect a vehicle occupant.

19. An inflation module for use in a vehicle, that stiffens a floor structure of a vehicle and which moves a seat of the vehicle to lessen the risk of injury to an occupant in side impact collisions, the inflation module comprising:

an inflator;

a linkage system that guides a seat vertically up and laterally toward a centerline of the vehicle in such a manner that the seat is uniformly displaced in a substantially curvilinear translation such that little or no tilting of the seat takes place; and an elongated inflatable structure, securely attached to the floor structure, wherein the elongated inflatable structure is oriented perpendicular to a sidewall of the vehicle, wherein the inflatable structure comprises metal.

20. The inflation module of claim 19, wherein a thickness of the metal of the inflatable structure is in the range of about 0.04 inches to about 0.06 inches.

21. The inflation module of claim 19, wherein the inflatable structure is disposed under a seat of the vehicle.

22. A method for lessening the risk of injury to an occupant in side-impact collisions using a the seat mounting structure comprising a linkage system, an inflation module, and a sensor system, the method comprising:

sensing an impending side impact;

actuating the inflation module to displace the seat mount; and guiding the seat mount vertically up and laterally toward a centerline of the vehicle in such a manner that the seat travels in a generally curvilinear translation such that little or no tilting of the seat takes place.

23. The method of claim 22, further comprising stiffening a floor structure of the vehicle to resist intrusion in a side-impact, via inflation of an inflatable structure.

24. The method of claim 23, wherein the inflatable structure comprises a folded elongated metal inflatable structure.

25. The method of claim 23, further comprising inflating a side airbag.

* * * * *